US011732638B2

(12) United States Patent
Houst et al.

(10) Patent No.: US 11,732,638 B2
(45) Date of Patent: Aug. 22, 2023

(54) E-CHARGER WITH LONGITUDINAL COOLING PASSAGE

(71) Applicant: Garrett Transportation I Inc., Torrance, CA (US)

(72) Inventors: Vit Houst, Sestajovice (CZ); Milan Nejedly, Brno (CZ); Daniel Turecek, Ostopovice (CZ); Pavel Krejci, Brno (CZ)

(73) Assignee: GARRETT TRANSPORTATION I INC., Torrance, CA (US)

(*) Notice: Subject to any disclaimer, the term of this patent is extended or adjusted under 35 U.S.C. 154(b) by 866 days.

(21) Appl. No.: 16/696,313

(22) Filed: Nov. 26, 2019

(65) Prior Publication Data
US 2021/0156299 A1    May 27, 2021

(51) Int. Cl.
*F02B 39/00*      (2006.01)
*F02B 39/10*      (2006.01)
*F04D 17/08*      (2006.01)
*F04D 29/043*     (2006.01)
*F04D 29/58*      (2006.01)
*H02K 5/16*       (2006.01)
*H02K 15/14*      (2006.01)
(Continued)

(52) U.S. Cl.
CPC ............ *F02B 39/005* (2013.01); *F02B 37/04* (2013.01); *F02B 39/10* (2013.01); *F04D 17/08* (2013.01); *F04D 29/043* (2013.01); *F04D 29/58* (2013.01); *H02K 5/16* (2013.01); *H02K 5/203* (2021.01); *H02K 9/08* (2013.01); *H02K 15/14* (2013.01)

(58) Field of Classification Search
CPC ........ F02B 39/005; F02B 37/04; F02B 39/10; F04D 17/08; F04D 29/043; F04D 29/58; F04D 29/668; F04D 25/0606; F04D 29/5806; H02K 5/16; H02K 9/08; H02K 9/19; H02K 15/14; H02K 7/1823; H02K 5/203; H02K 5/04; H02K 7/14; F02C 6/12
See application file for complete search history.

(56) References Cited

U.S. PATENT DOCUMENTS 9,976,561 B2    5/2018  Huscher et al.
2008/0185924 A1*  8/2008  Masoudipour ......... H02K 5/203
                                               29/890.035
(Continued)

FOREIGN PATENT DOCUMENTS

CN       110299787 A     10/2019
DE     102007035271 A1    1/2009

*Primary Examiner* — Mickey H France
*Assistant Examiner* — Edward Bushard
(74) *Attorney, Agent, or Firm* — Lorenz & Kopf, LLP

(57) ABSTRACT

An e-charger includes a motor case that encases the motor and an outer housing that houses the motor case. The e-charger additionally includes a cooling system with passages cooperatively defined by the outer housing and the motor case. First and second longitudinal passages extend between the first and second ends of the motor, and a second longitudinal passage extends between the second and first ends of the motor. The end passage fluidly connects the first and second longitudinal passage. The cooling system is configured for directing flow of the coolant from the inlet, through the first longitudinal passage in a first longitudinal direction with respect to the axis, through the end passage, and back through the second longitudinal passage in a second longitudinal direction with respect to the axis.

18 Claims, 7 Drawing Sheets

(51) Int. Cl.
*F02B 37/04* (2006.01)
*H02K 9/08* (2006.01)
*H02K 5/20* (2006.01)

(56) References Cited

U.S. PATENT DOCUMENTS

| | | | |
|---|---|---|---|
| 2014/0354089 A1* | 12/2014 | Chamberlin | H02K 9/19 310/54 |
| 2015/0256051 A1 | 9/2015 | Hippen et al. | |
| 2017/0271956 A1 | 9/2017 | Hanumalagutti et al. | |

* cited by examiner

E-CHARGER WITH LONGITUDINAL COOLING PASSAGE

TECHNICAL FIELD

The present disclosure generally relates to an e-charger and, more particularly, relates to an e-charger with a longitudinal cooling passage.

BACKGROUND

Some vehicles include a charging device, such as a turbocharger or supercharger, that boosts engine performance by compressing air that is then fed to the engine. These devices may also be employed in fuel cell systems or other systems. In some cases, an e-charger may be provided. The e-charger may include an electric motor that is configured to drive and rotate a compressor wheel for compressing an airflow, which is then fed to an engine, a fuel cell stack, etc.

These charging devices may include a cooling system. In the case of an e-charger, for example, a cooling system may be provided that directs flow of a coolant through the device to maintain operating temperatures within a predetermined range. The electric motor may be cooled, for example, to improve operating efficiency of the motor.

However, conventional cooling systems for e-chargers suffer from various deficiencies, and operating efficiency may be negatively affected as a result. It may be difficult to provide an acceptable cooling effect for some charging devices and/or under certain operating conditions. There may be space constraints that limit the size and/or routing of the cooling circuit and, thus, negatively affects cooling performance.

Thus, it is desirable to provide a cooling system for an e-charger that improves the cooling effect. It is also desirable to provide an e-charger cooling system that is compact, highly manufacturable, and that is cost effective. Other desirable features and characteristics of the present disclosure will become apparent from the subsequent detailed description and the appended claims, taken in conjunction with the accompanying drawings and this background discussion.

BRIEF SUMMARY

In one embodiment, an e-charger is disclosed that includes a motor that drives a shaft for rotation about an axis. The axis extends through a first end of the motor and a second end of the motor. The e-charger also includes a compressor wheel that is attached to the shaft to be rotatably driven by the motor to thereby provide a compressed fluid stream. The e-charger further includes a motor case that encases the motor and an outer housing that houses the motor case. The e-charger additionally includes a cooling system with an inlet, an outlet, and a plurality of passages fluidly connecting the inlet and the outlet. The plurality of passages is cooperatively defined by the outer housing and the motor case. The plurality of passages includes a first longitudinal passage, a second longitudinal passage, and an end passage. The first longitudinal passage extends between the first and second ends of the motor. The second longitudinal passage extends between the second and first ends of the motor. The end passage fluidly connects the first longitudinal passage and the second longitudinal passage. The cooling system is configured for directing flow of the coolant from the inlet, through the first longitudinal passage in a first longitudinal direction with respect to the axis, through the end passage, and back through the second longitudinal passage in a second longitudinal direction with respect to the axis.

In another embodiment, a method of manufacturing an e-charger is disclosed. The method includes encasing a motor in a motor case, wherein the motor is configured to drive a shaft for rotation about an axis, and the axis extends through a first end of the motor and a second end of the motor. The method also includes attaching a compressor wheel to the shaft to be rotatably driven by the motor to thereby provide a compressed fluid stream. Furthermore, the method includes housing the motor case with an outer housing, including providing a cooling system that is at least partly disposed between motor case and the outer housing. The cooling system includes an inlet, an outlet, and a plurality of passages fluidly connecting the inlet and the outlet. The plurality of passages is cooperatively defined by the outer housing and the motor case. The plurality of passages includes a first longitudinal passage, a second longitudinal passage, and an end passage. The first longitudinal passage extends between the first and second ends of the motor. The second longitudinal passage extends between the second and first ends of the motor. The end passage fluidly connects the first longitudinal passage and the second longitudinal passage. The cooling system is configured for directing flow of coolant from the inlet, through the first longitudinal passage in a first longitudinal direction with respect to the axis, through the end passage, and back through the second longitudinal passage in a second longitudinal direction with respect to the axis.

In an additional embodiment, an e-charger is disclosed that includes an electric motor that drives a shaft for rotation about an axis. The axis extends through a first end of the motor and a second end of the motor. The e-charger also includes a compressor wheel that is attached to the shaft to be rotatably driven by the motor to thereby provide a compressed fluid stream. Also, the e-charger includes a motor case that encases the motor and an outer housing that houses the motor case. The outer housing includes a plurality of nesting surfaces that nest with the motor case. Furthermore, the e-charger includes a cooling system with an inlet, an outlet, and a plurality of passages fluidly connecting the inlet and the outlet. The plurality of passages is cooperatively defined by the outer housing and the motor case. The plurality of passages include a first longitudinal passage disposed in a first quadrant with respect to the axis, a second longitudinal passage disposed in a second quadrant with respect to the axis, a third longitudinal passage disposed in a third quadrant with respect to the axis, a fourth longitudinal passage disposed in a fourth quadrant with respect to the axis, a first end receiving passage at the first end and fluidly connecting the inlet and the first longitudinal passage, a second end connecting passage at the second end and fluidly connecting the first and second longitudinal passages, a first end connecting passage at the first end and fluidly connecting the second and third longitudinal passages, a second end connector passage at the second end and fluidly connecting the third and fourth longitudinal passages, and a first end discharge passage at the first end and fluidly connecting the fourth longitudinal passage and the outlet. The first, second, third, and fourth longitudinal passages extend between the first and second ends of the motor. The cooling system is configured for directing flow of the coolant from the inlet, through the first end receiving passage, through the first longitudinal passage in a first longitudinal direction with respect to the axis, through the second end connecting passage, back through the second longitudinal passage in a second longitudinal direction with respect to the axis, through the first end connecting passage, through the third longitudinal passage in the first longitudinal direction, through the second end connector passage, through the fourth longitudinal passage, through the first end discharge passage, to the outlet.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved e-charger. The disclosed e-charger may be a device with a motor that drives a compressor wheel for providing a compressed airstream to a downstream component (e.g., to a fuel cell stack, to an internal combustion engine, etc.). Also, the e-charger of the present disclosure may be configured as an electric supercharger, a hybrid turbocharger, an e-boost device, an e-turbo device, an e-assist charging device, or other related component.

In particular, an e-charger and methods of manufacturing the same are disclosed, wherein the e-charger also includes a fluid system for a coolant (i.e., "a cooling system"). The cooling system may include a plurality of passages that may collectively define a cooling jacket that surrounds a majority of the motor. The passages may also be fluidly connected (e.g., in-series) from an inlet to an outlet.

In some embodiments, the inlet and the outlet may be provided proximate one end of the motor. Also, in some embodiments, at least some of the passages may extend longitudinally toward the opposite end of the motor and other passages may extend back longitudinally toward the first end. There may also be at least one passage fluidly connecting two longitudinal passages, and in some embodiments, this connecting passage may extend along an end of the motor.

Furthermore, in some embodiments, the cooling system may include distinct longitudinal passages that provide flow back-and-forth longitudinally between the ends of the motor. Also, end passages may fluidly connect different pairs of the longitudinal passages. These passages may provide cooling to the motor, to one or more bearings, and/or to other components of the e-charger.

The disclosed e-charger may provide various advantages. For example, the layout and construction of the cooling system may be relatively simple and compact and, yet, may provide effective cooling for the motor, bearings, electronics, and/or other components. Also, flow through the cooling system may result in relatively low pressure loss. Also, the coolant may flow along a labyrinthine path at a relatively high Reynolds number, resulting in high cooling capacity. The cooling system provides high cooling efficiency and maintains the motor, bearing, and/or other components within acceptable operating temperatures for a long operating lifetime. The e-charger may operate at high efficiency in a wide variety of operating conditions as a result. Moreover, the e-charger may have high manufacturability due to the features of the present disclosure.

Figure 1:
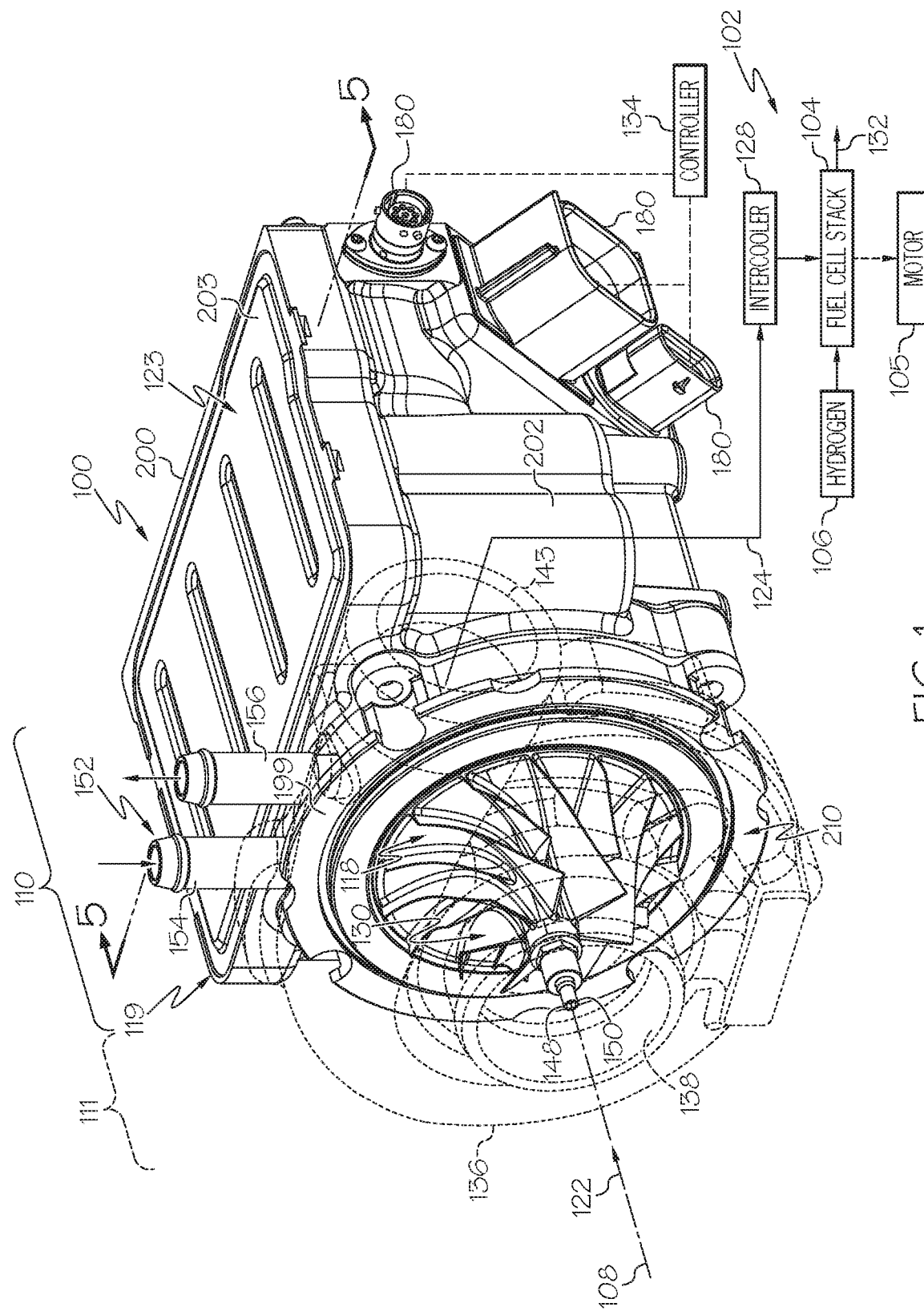
FIG. 1 is a schematic view of a charging device, such as an e-charger, and a fuel cell system according to example embodiments of the present disclosure.

FIG. 1 is a schematic view of an example e-charger 100 according to example embodiments of the present disclosure. It will be appreciated that the term "e-charger" as used herein will be understood broadly by those in the art, for example, to include devices with an electrically driven compressor wheel regardless of where the e-charger 100 is incorporated, the type of system in which the e-charger 100 is incorporated, etc. It will also be appreciated that the e-charger 100 of the present disclosure may also be referred to as an electrically driven compressor assembly. Also, the e-charger 100 of the present disclosure may be operatively attached to an exhaust-driven turbine wheel, for example, in a hybrid turbocharger or e-assist turbocharger. The e-charger 100 may also be configured as an electric supercharger, as an e-boost device, e-turbo, or other related component. Also, the e-charger 100 may be fluidly and otherwise operatively coupled to additional charging devices, either upstream or downstream of the e-charger 100.

As shown, the e-charger 100 may be incorporated within a fuel cell system 102. Also, as shown, the e-charger 100 may be configured as an electric compressor device (i.e., electric supercharger) with a single-stage compressor.

Generally, the e-charger 100 may include a motor section 110 with a first end 199 and a second end 200. The e-charger 100 may also include a compressor section 111. The motor section 110 may drive a rotating group 118 of the e-charger 100 about an axis 108 relative to a housing 119 of the e-charger 100, thereby providing a compressed airstream (represented by arrow 124) to a fuel cell stack 104 of the fuel cell system 102.

It will be appreciated that the e-charger 100 and/or features of the present disclosure may be configured differently than the illustration. Also, it will be appreciated that the e-charger 100 may be incorporated within a system other than a fuel cell system. For example, the e-charger 100 may be configured for supplying the compressed airstream 124 to an internal combustion engine, to another charging device, etc.

The motor section 110 of the e-charger 100 may include an electric motor 103 with a stator 146 and a rotor 148 (FIGS. 2, 3, and 5), which are centered on the axis 108. The rotor 148 may be fixed to a shaft 150 for rotation as a unit about the axis 108. The shaft 150 may project from the rotor 148 and away from the first end 199 of the motor section 110. Furthermore, the motor section 110 may include one or more parts of the housing 119. For example, the housing 119 may include a motor housing 123, which houses, encapsulates, and/or surrounds the stator 146 and at least part of the rotor 148 in the motor section 110.

The compressor section 111 may include a compressor wheel 130, which may be mounted on the shaft 150 at the first end 199 of the motor section 110. The compressor wheel 130 may be fixed to the rotor 148 via the shaft 150 to rotate as a unit with the rotating group 118 of the e-charger 100. The compressor wheel 130 may be fixed to the shaft 150 via one or more fasteners, weldments, and/or other attachment. The compressor section 111 may also include one or more parts of the housing 119. The compressor section 111 may include a compressor housing member 136 (shown in phantom in FIG. 1). The compressor housing member 136 may be fixed to a side of the motor housing 123 (e.g., by fasteners, weldments, or other attachments). The compressor housing member 136 may include a volute structure with an axial inlet 138 and an outlet 143. The compressor housing member 136 may be a unitary, one-piece compressor housing member 136. The axial inlet 138 may be tubular, straight, and centered on the axis 108. The outlet 143 may be directed outward and tangential to a circle that is centered on the axis 108.

The motor 103 may drivingly rotate the compressor wheel 130 within the compressor housing member 136 about the axis 108. An inlet airstream (represented by arrow 122 in FIG. 1) may flow into the inlet 138 and flow through the compressor housing 136. A resultant compressed airstream (represented by arrow 124) may be directed from the outlet 143. In some embodiments, the compressed airstream 124 may be cooled by an intercooler 128 and may flow to the fuel cell stack 104 for boosting the operating efficiency of the fuel cell system 102.

The fuel cell stack 104 (FIG. 1) may contain a plurality of fuel cells. Hydrogen may be supplied to the fuel cell stack 104 from a tank 106, and oxygen may be supplied to the fuel cell stack 104 to generate electricity by a known chemical reaction. The fuel cell stack 104 may generate electricity for an additional electric motor 105 and/or other connected electrical devices. The fuel cell system 102 may be included in a vehicle, such as a car, truck, sport utility vehicle, van, motorcycle, aircraft, etc. Accordingly, in some embodiments, the electric motor 105 may convert the electrical power generated by the fuel cell stack 104 to mechanical power to drive and rotate an axle (and, thus, one or more wheels) of the vehicle. In some embodiments, the fuel cell stack 104 may provide electricity for the stator 146 to drivingly rotate the rotor 148 and other components of the rotating group 118 of the e-charger 100. However, it will be appreciated that the fuel cell system 102 may be configured for a different use without departing from the scope of the present disclosure.

Furthermore, an exhaust gas stream (represented by arrow 132) from the fuel cell stack 104 may be exhausted to atmosphere as represented in FIG. 1. Stated differently, the exhaust gas stream 132 may be directed away from the e-charger 100. In other embodiments, the exhaust gas stream 132 may be directed back toward the e-charger 100, for example, to drive rotation of a turbine wheel that is included in the rotating group 118. This may, in turn, drive rotation of the compressor wheel 130, for example, to assist the electric motor 103.

The e-charger 100 and/or other components of the fuel cell system 102 may be controlled by a controller 134 (FIG. 1). The controller 134 may be a computerized system with a processor, various sensors, and other components for electrically controlling operation of the motor 112, the fuel cell stack 104, and/or other features of the system 102. In some embodiments, the controller 134 may define or may be part of the electrical control unit (ECU) of a vehicle.

Accordingly, the controller 134 may generate control commands for turning the motor 103 of the e-charger 100 ON and OFF and/or for changing the speed of the motor 103. The controller 134 may generate these control commands based on input from sensors. Thus, the speed of the motor 103 (and, thus, the rotational speed of the compressor wheel 130) may be controlled, for example, based on a sensed throttle position or other sensed characteristic of the system.

Furthermore, the e-charger 100 may include a cooling system, which is indicated generally at 152 in the Figures, and which will be discussed in detail below according to example embodiments. The cooling system 152 may include an inlet 154, an outlet 156 and a plurality of passages 158 (FIGS. 5-7) defined through the housing 119 for conducting a flow of coolant (e.g., liquid coolant) from the inlet 154 to the outlet 156. The cooling system 152 may define a cooling jacket that surrounds a majority of the motor 103. As will be discussed, the cooling system 152 may be routed through the housing 119 to provide effective cooling while also ensuring that the e-charger 100 is compact and relatively lightweight. Additionally, the cooling system 152 provides various manufacturing advantages as will be discussed.

Figure 2:
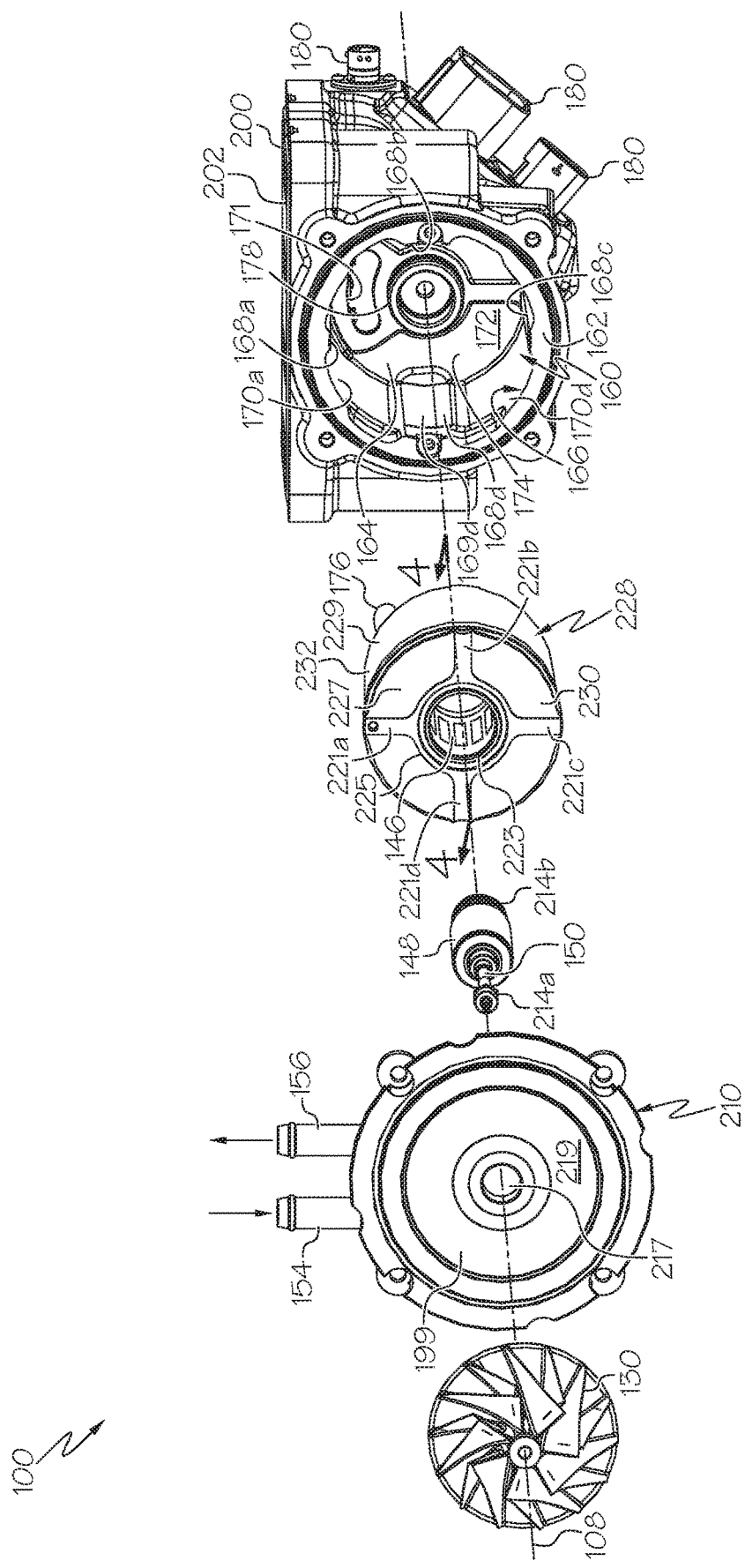
FIG. 2 is a front perspective exploded view of the e-charger of FIG. 1.
Figure 5:
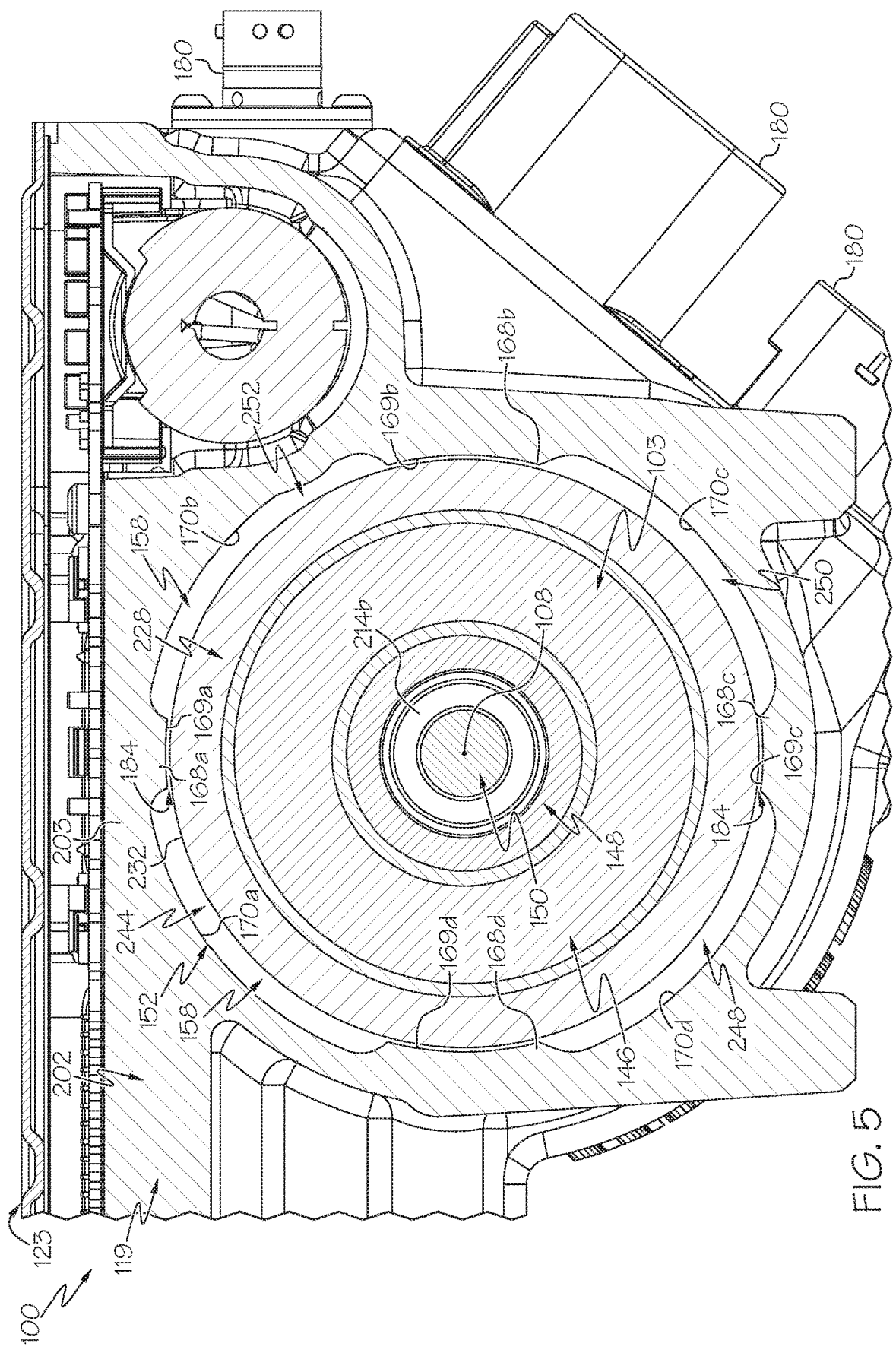
FIG. 5 is a cross-sectional view of the e-charger taken along the line 5-5 of FIG. 1.

Referring to FIGS. 1-3 and 5, the motor housing 123 of the e-charger 100 will now be discussed in greater detail according to example embodiments. The motor housing 123 may include an outer housing 202 (FIG. 1) with an outer body 203 (FIGS. 2 and 3) (i.e., outer structure, outer member, etc.). The outer body 203 may be block-shaped with a variety of rigid, strong, supportive structures made, for example, from metal. The outer body 203 may include a receptacle 160 (FIG. 2). The receptacle 160 may be generally barrel-shaped, cylindrical, etc. The receptacle 160 may be centered on the axis 108 and recessed along the axis 108 from the first end 199 of the motor section 110 toward the second end 200. The receptacle 160 may be open at the first end 199 and closed off at the second end 200 by an end plate 164 (FIG. 3) of the outer body 203. As shown in FIG. 2, the receptacle 160 may include a circular rim 162. The receptacle 160 may also include an inner diameter surface 166 with one or more projections 168a, 168b, 168c, 168d (FIGS. 2 and 5).

The projections 168a-168d may be elongate rails that project radially inward toward the axis 108. The projections 168a-168d may extend longitudinally along the axis 108 (e.g., substantially parallel to the axis 108) from the first end 199 to the second end 200 of the motor section 110. The projections 168a-168d may be spaced substantially equally about the axis 108. As shown, there may be four projections 168a-168d, which are spaced apart by ninety degrees (90°) from neighboring ones of the projections 168a-168d with respect to the axis 108. Each projection 168a-168d may include a respective inward-facing nest surface 169a, 169b, 169c, 169d. The nest surfaces 169a-169d may be substantially smooth and may be arcuately curved about the axis 108. The nest surfaces 169a-169d may also extend longitudinally along (e.g., parallel to) the axis 108 between the first end 199 and the second end 200.

Also, the inner diameter surface 166 of the receptacle 160 may include intermediate surfaces 170a, 170b, 170c, 170d, which are each defined circumferentially between neighboring pairs of the nest surfaces 169a-169d. For example, as shown in FIG. 5, the intermediate surface 170a may be defined between the nest surface 169a and the nest surface 169d. The intermediate surface 170b may be defined between the nest surface 169a and the nest surface 169b. The intermediate surface 170c may be defined between the nest surface 169b and the nest surface 169c. The intermediate surface 170d may be defined between the nest surface 169c and the nest surface 169d. Generally, the intermediate surfaces 170a-170d may contour arcuately about the axis 108 and may extend longitudinally along the axis 108 from the first end 199 to the second end 200 of the motor section 110. The intermediate surfaces 170a-170d may also include various contoured surfaces that define the transitions to respective ones of the nest surfaces 169a-169d.

Furthermore, the outer body 203 may include the end plate 164. The end plate 164 may be a relatively flat panel that is arranged normal to the axis 108 and that defines a majority of the second end 200 of the motor section 110. As shown in FIG. 2, the end plate 164 may include an inner surface 172 that faces inwardly along the axis 108 and that defines the closed longitudinal end of the receptacle 160, proximate the second end 200. The inner surface 172 may include one or more recesses 174. For example, there may be two arcuate recesses 174 arranged on opposite sides of the axis 108. Furthermore, there may be an opening 171 for receiving electrical connectors 176 of the motor 112. In addition, the inner surface 172 may include a bearing mount 178. The bearing mount 178 may be a hollow, cylindrical projection that is centered on the axis 108. The bearing mount 178 may be integrally connected to the other portions of the end plate 164 and may project inwardly along the axis 108 partially into the receptacle 160.

The outer body 203 may further include one or more electrical connector structures 180 that project substantially radially outward. The electrical connector structures 180 may support one or more electrical connectors that provide electrical communication with the controller 134.

The outer housing 202 may further include an end plate 210 (i.e., an end member). The end plate 210 may be round, thin and disposed transverse (e.g., substantially perpendicular) to the axis 108. The end plate 210 may be removably attached to the outer body 203 at the first end 199 of the motor section 110 to cover over and close off the receptacle 160. The end plate 210 may be removably attached and fixed to the outer body 203 via fasteners in some embodiments. The end plate 210 may include an inner surface 211 (FIG. 3) that faces inward into the receptacle 160. The inner surface 211 may include a bearing mount 213, which is hollow, cylindrical, and centered on the axis 108. The bearing mount 213 may project along the axis 108 partially into the receptacle 160. The inner surface 211 may also include a plurality of projections 215a, 215b, 215c, 215d that are elongate and that project radially outward from the bearing mount 213 to the outer diameter of the end plate 210. There may be four projections 215a, 215b, 215c, 215d in some embodiments, and they may be spaced substantially equally about the axis 108 (e.g., spaced apart by ninety degrees (90°)). The end plate 210 may further include a central aperture 217. The shaft 150 may pass through the end plate 210 via the central aperture 217. The compressor wheel 130 may be fixed to the shaft 150 to be disposed at an outer surface 219 of the end plate 210.

Figure 3:
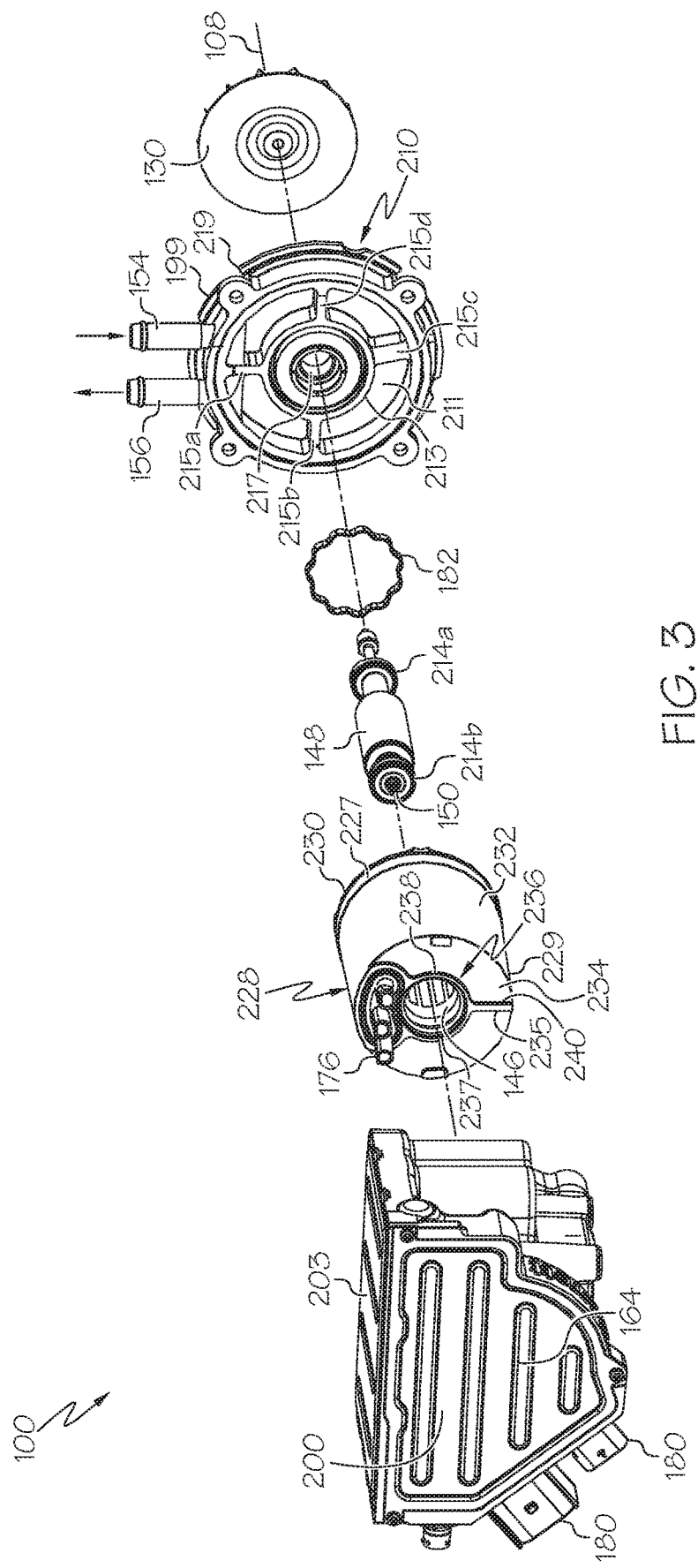
FIG. 3 is a rear perspective exploded view of the e-charger of FIG. 1.

The e-charger 100 may additionally include one or more dampeners 182 (FIG. 3). The dampener 182 may be shaped as a continuous band with wavy or otherwise uneven surfaces on its inner and/or outer radially-facing surfaces. The dampener 182 may have a thickness measured between these opposite radially-facing surfaces, and this thickness may remain substantially continuous along the dampener 182. The dampener 182 may be made of an elastomeric material, a resilient metal material, or otherwise. The dampener 182 may be received within the bearing mount 213. The dampener 182 may resiliently deflect in the due to vibrations and/or other forces during operation. The dampener 182 may resiliently recover to the neutral shape shown in FIG. 3 (i.e., the dampener 182 may be biased toward the neutral position) to counterbalance and/or dampen the vibrations or other forces.

The e-charger 100 may further include one or more bearings 214a, 214b. The bearing(s) 214a, 214b may support the shaft 150 for rotation about the axis 108. In some embodiments, there may be two bearings 214a, 214b, and both may be a roller-type bearing. One bearing 214a may be disposed proximate the first end 199 and may include an outer member (e.g., an outer race) that is fixed within the bearing mount 213 of the end plate 210, an inner member (e.g., an inner race) that is fixed to the shaft 150, and a plurality of roller elements that are disposed between the outer member and the inner member for supporting rotation of the shaft 150. The other bearing 214b may be disposed proximate the second end 200 and may include an outer member fixed within the bearing mount 178 of the end plate 164, an inner member fixed to the shaft 150, and roller elements disposed therebetween.

The motor housing 123 may further include a motor case 228. The motor case 228 may encase the motor 103, and the motor case 228 may be received within the receptacle 160 of the outer body 203. The motor case 228 may be substantially cylindrical and hollow. The exterior of the motor case 228 may include a first longitudinal end face 230, an outer diameter surface 232, and a second longitudinal end face 234. The outer diameter surface 232 may extend circumferentially about the axis 108 and may extend longitudinally between the first and second longitudinal end faces 230, 234. The outer diameter surface 232 may be centered with respect to the axis 108. A majority of the outer diameter surface 232 may be substantially smooth and continuous about the axis 108. The first and second longitudinal end faces 230, 234 may be disposed on opposite ends of the outer diameter surface 232 with the first longitudinal end face 230 proximate the first end 199 of the motor section 110 and the second longitudinal end face 234 proximate the second end 200. The first and second longitudinal end faces 230, 234 may be annular and may be disposed substantially perpendicular to the axis 108.

The first longitudinal end face 230 may include a plurality of rail-like projections 221a, 221b, 221c, 221d (FIG. 2) that project along the axis 108 toward the first end 199. Each projection 221a-221d may extend radially from a central opening 223 to the outer diameter of the end face 230. In some embodiments, there may be four projections 221a-221d that are spaced apart equally about the axis 108 (e.g., spaced apart by ninety degrees (90°)). The inner ends of the projections 221a-221d may also be flush with an annular projection 225 that encircles the central opening 223. The second longitudinal end face 234 may include a projection 235 (FIG. 3) that projects along the axis 108 toward the second end 200 from surrounding areas of the face 234. A portion of the projection 235 may extend about the connectors 176 and about a central opening 237 of the end face 234. Another portion of the projection 235 may be rail-shaped and may extend in the radial direction away from the central opening 237 to the outer diameter of the end face 234.

The rotor 148 and the stator 146 may be disposed longitudinally between the first and second longitudinal end faces 230, 234, and the outer diameter surface 232 may continuously surround and cover over the stator 146. The shaft 150 may extend through the central openings 223, 237 to connect to the bearings 214a, 214b.

Figure 4:
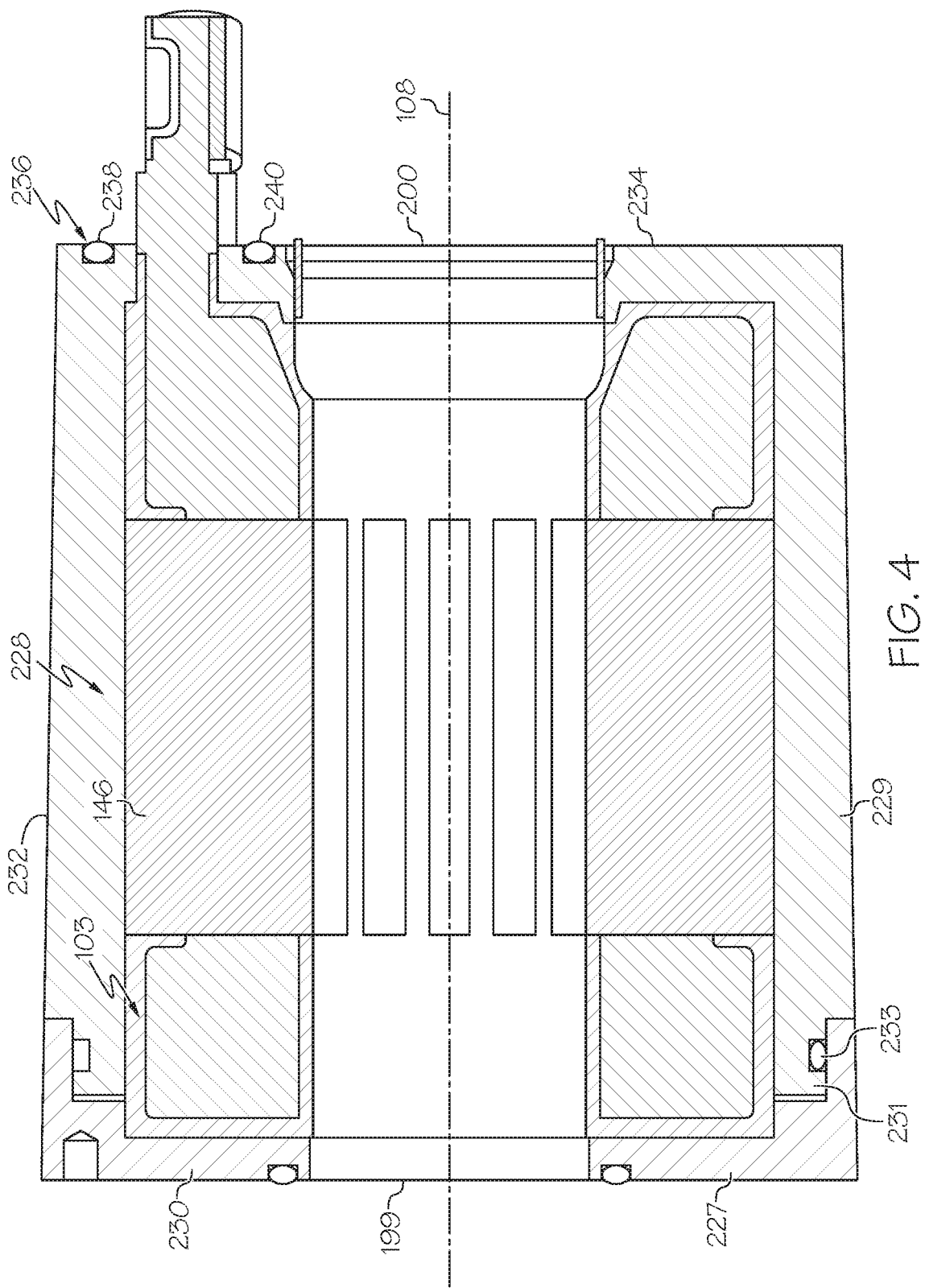
FIG. 4 is a longitudinal section view of a motor stator and motor case of the e-charger taken along the line 4-4 of FIG. 2.

In some embodiments, the motor case 228 may be formed via a casting process and may be formed of metal. Also, as shown in FIGS. 2-4, the motor case 228 may be a multi-part shell conforming in shape to the stator 146. For example, a first member 227 of the motor case 228 may define the first longitudinal end face 230, and a second member 229 of the motor case 228 may define the second longitudinal end face 234 and a majority of the outer diameter surface 232. Thus, in some embodiments, the second member 229 may be a hollow cylindrical structure with an open end that is closed off and covered by the first member 227. Also, as shown in FIG. 4, the first member 227 may receive an upper rim portion 231 of the second member 229 and may be fixedly attached thereto. A first seal member 233 may be included for creating a substantially hermetic seal between the first and second members 227, 229. The first seal member 233 may be an O-ring that is received in an outer diameter groove of the second member 229 and that seals against a substantially smooth opposing surface of the first member.

The motor case 228 and the motor 103 therein may be received within the outer housing 202. Specifically, the motor case 228 may be received within the receptacle 160 of the outer body 203, and the end plate 164 may be fixed to the rim 162 (i.e., the end plate 164 and outer body 203 cooperatively house the motor case 228 and the motor 103 therein). The motor case 228 may be received in the receptacle 160 with the second longitudinal end face 234 facing (opposing) the inner surface 172 of the end plate 164. Also, the outer diameter surface 232 may oppose the inner diameter surface 166 of the outer housing 202. Furthermore, with the end plate 210 installed on the outer housing 202, the first longitudinal end face 230 may oppose the inner surface 211. As shown in FIGS. 3 and 4, a second seal member 236 may be included between the second longitudinal end face 234 and the inner surface 172 of the end plate 164. As shown in FIG. 3, the second seal member 236 may extend along at least part of the projection 235. The second seal member 236 may be made from an elastomeric material and may include a first portion 238 that extends about the connectors 176 and the central opening 237 and a second portion 240 that extends along both radially-extending edges of the projection 235. The second seal member 236 may substantially hermetically seal against the opposing inner surface 172. Additionally, there may one or more features (i.e., anti-rotation features) that retain the motor case 228 against rotation about the axis 108 relative to the outer housing 202.

As mentioned above, the e-charger 100 may include the cooling system 152 (i.e., coolant jacket, cooling circuit, etc.). The cooling system 152 may include a plurality of fluid channels, reservoirs, passages, circuits, etc. that receive one or more flows of liquid coolant. The coolant may flow through the cooling system 152 and remove heat from the e-charger 100 to maintain high operating efficiency. The cooling system 152 and flow therethrough is illustrated schematically in FIGS. 6 and 7. The cooling system 152 may extend through the motor housing 123, and a majority of the cooling system 152 may be cooperatively defined by (and defined between) the outer housing 202 and the motor case 228. The plurality of fluid passages 158 of the cooling system 152 may be connected in-series in some embodiments from the inlet 154 to the outlet 156. Fluid coolant may pass from the inlet 154, through the passages 158, and out via the outlet 156, and heat may transfer to the coolant and out of the e-charger 100 to maintain operations within a predetermined temperature range. For example, heat from the motor 222, the bearings 214a, 214b, and/or the housing 123 may transfer to the coolant to be carried away from the e-charger 100.

In some embodiments, different ones of the plurality of passages 158 may be separated by one or more fluid boundaries 184 (i.e., dams, barriers, fluid retainers, etc.) as will be discussed, the motor case 228 may include a projection that partly defines the fluid boundary member, and the outer housing 202 may include a surface that nests with the projection. The surfaces may nest to cooperatively define the respective fluid boundary 184. The surfaces may "nest" in a variety of ways without departing from the scope of the present disclosure. For example, the surfaces may be flat and planar but closely adjacent to nest together. Also, in some embodiments, the surfaces may have corresponding contours, shapes, etc. One nesting surface may be concave while the other may be convex and may have corresponding radii in some embodiments. These surfaces may or may not come into abutting contact.

As shown in FIGS. 2, 3, 6, and 7, the inlet 154 and the outlet 156 may both be disposed proximate the first end 199. Also, in some embodiments, the inlet 154 and the outlet 156 may be substantially parallel (i.e., the axes of the inlet 154 and outlet 156 may be straight and substantially parallel). Furthermore, the inlet 154 and the outlet 156 may be disposed on a common side of the axis 108 as shown. The inlet 154 and the outlet 156 may extend radially through the end plate 210. With the inlet 154 and outlet 156 in this arrangement, the e-charger 100 may be compact and coolant lines to/from the e-charger 100 may be incorporated and attached easily to the fuel cell system 102.

Figure 6:
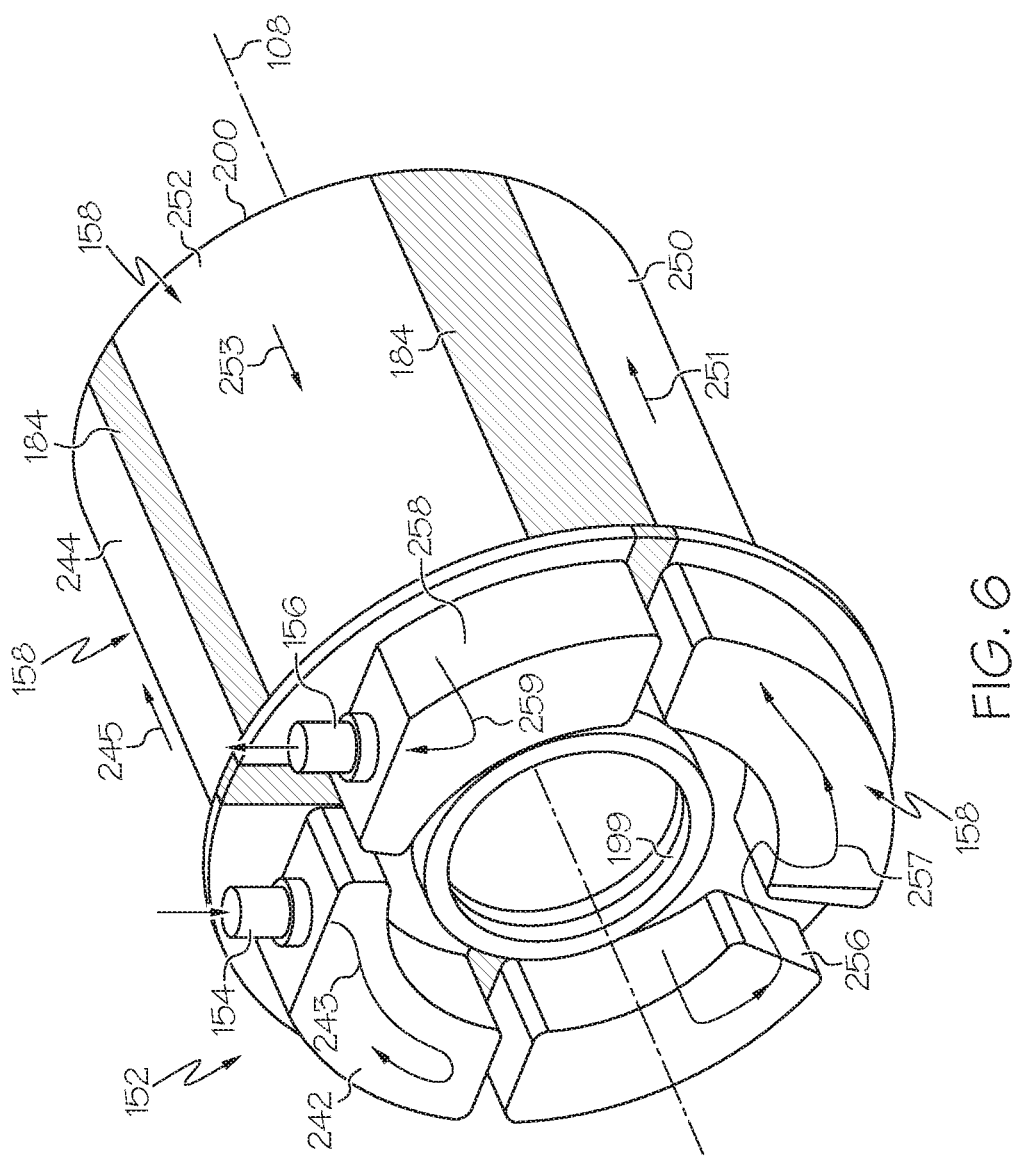
FIG. 6 is a front perspective view of a coolant flow circuit through the e-charger of FIG. 1.
Figure 7:
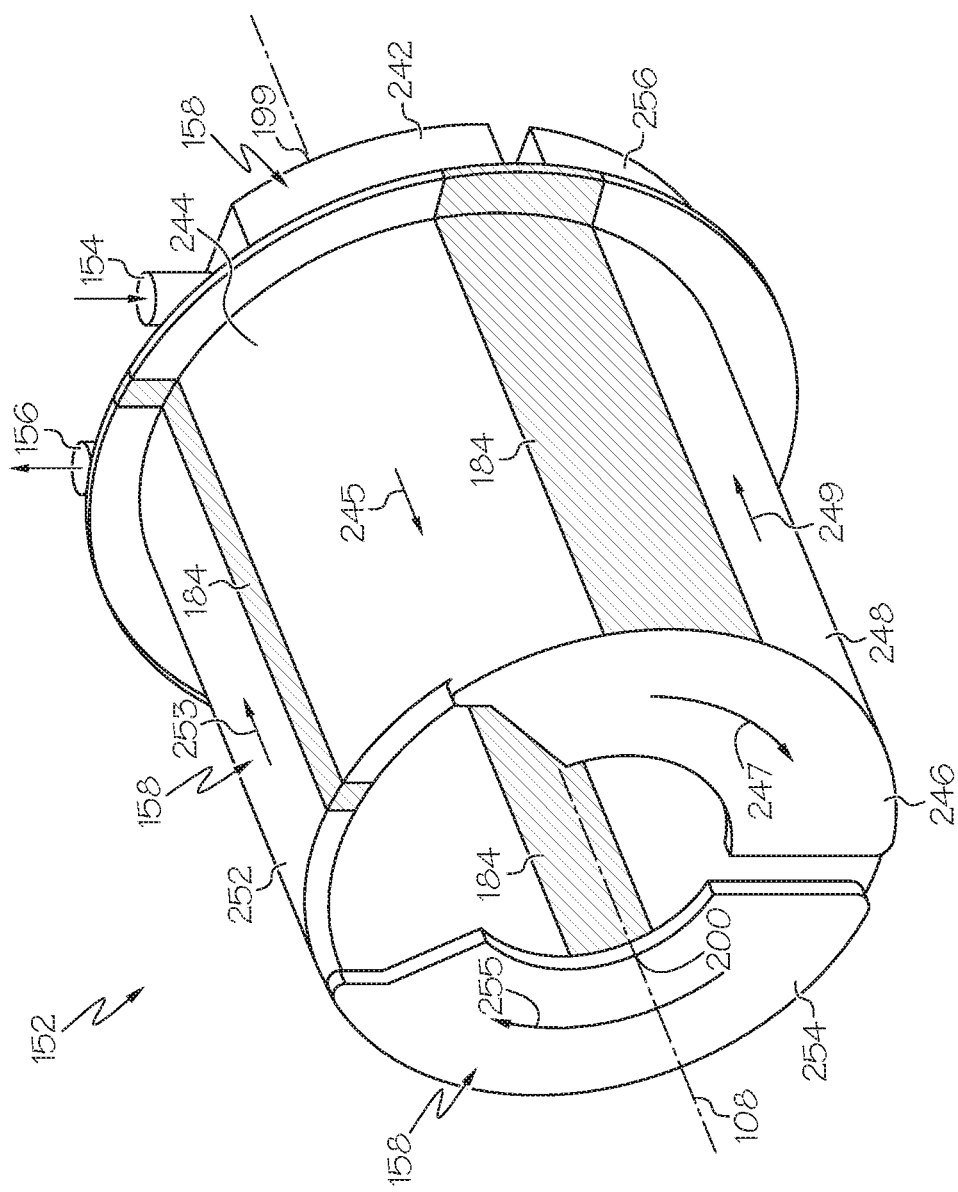
FIG. 7 is a rear perspective view of the coolant flow circuit through the e-charger of FIG. 1.

The plurality of passages 158 (FIGS. 5-7) may define a single, continuous fluid path from the inlet 154 to the outlet 156. The passages 158 and the fluid flow path through the cooling system 152 is illustrated in FIGS. 6 and 7. For purposes of clarity, only the voids defined between the outer housing 202 and the motor case 208 are shown in FIGS. 6 and 7. Some of the fluid boundaries 184 are indicated in FIGS. 6 and 7 with cross hatching for clarity to distinguish from the passages 158.

In some embodiments, the plurality of passages 158 may include at least one longitudinal passage, which extend generally along the axis 108 between the first end 199 and the second end 200. For example, there may be at least four such longitudinal passages. In the illustrated embodiments, for example, the e-charger 100 may include a first longitudinal passage 244, a second longitudinal passage 248, a third longitudinal passage 250, and a fourth longitudinal passage 252. At least one of these longitudinal passages may extend substantially parallel to the axis 108 and may direct the coolant in either a first direction along the axis (from the first end 199 to the second end 200) or in a second direction (from the second end 200 to the first end 199).

Also, the plurality of passages 158 may include at least one transverse passage, which extend transverse to the axis 108 (generally radially and/or arcuately about the axis). In some embodiments, the transverse passage(s) may provide flow in the radial and/or circumferential direction with respect to the axis 108. Also, the transverse passage may be disposed proximate the first end 199 or the second end 200. For example, the e-charger 100 may include a first end receiving passage 242 (a first transverse passage). As shown in the illustrated embodiments of FIGS. 6 and 7, the inlet 154 may be fluidly connected to the first receiving passage 242. Other transverse passages may be included, such as a second end connecting passages 246, 254, a first end connecting passage 256, and a first end discharge passage 258.

The first end receiving passage 242 may be defined at the first end 199 between the end plate 210 and the first longitudinal end face 230 of the motor case 228. The projections 215a, 215d and bearing mount 213 of the end plate 210 may nest, respectively, against the projections 221a, 215d, 225 of the motor case 228 to cooperatively define a wall, dam, or other fluid boundary 184 for directing flow of the coolant. These opposing surfaces of the end plate 210 and the motor case 228 may be closely adjacent and, in some embodiments, may abut and/or seal together. However, this is not mandatory, and some amount of permitted leakage may occur across the nesting surfaces while the boundary 184 contains a majority of the coolant within the passage 242.

As shown, the first end receiving passage 242 may be confined to a first quadrant of the e-charger 100 with respect to the axis 108 at the first end 199 of the e-charger 100. Flow into the first end receiving passage 242 may be received from the inlet 154 radially, and redirected transversely and arcuately about the axis 108, for example, to provide cooling to the bearing 214a. Flow from the first end receiving passage 242 may also be redirected toward the first longitudinal passage 244. This flow within and through the first end receiving passage 242 is illustrated generally by arrow 243 in FIG. 6.

The first longitudinal passage 244 may be defined between the outer diameter surface 232 of the motor case 228 and the inner diameter surface 166 of the outer body 203. More specifically, the passage 244 may be defined between the intermediate surface 170a and the outer diameter surface 232 as shown in FIG. 5. The first longitudinal passage 244 may be fluidly connected to the first end receiving passage 242 and may receive flow therefrom. The nest surface 169a may nest with the surface 232 of the motor case 228, and the nest surface 169d may nest with the surface 232 to define the respective fluid boundaries 184. As shown in FIG. 5, the first longitudinal passage 244 may be arcuate with respect to the axis 108. The first longitudinal passage 244 may extend arcuately within the first quadrant of the axis 108 (along with the first end receiving passage 242), and the first longitudinal passage 244 may pass longitudinally from the first end 199 to the second end 200 as indicated by arrow 245. The axis of the passage 244 may be parallel to the axis 108 in some embodiments. Coolant flow from the first end receiving passage 242 may be received and directed longitudinally along the axis 108 for cooling the motor 103.

Furthermore, as shown in FIG. 7, the cooling system 152 may include the second end connecting passage 246. The second end connecting passage 246 may be defined at the second end 200 between the end plate 164 and the second longitudinal end face 234 of the motor case 228. The first portion 238 and the second portion 240 of the projection 235 may nest against the inner surface 172 of the end plate 164 to define the second end connecting passage 246 for cooperatively defining a respective fluid boundary 184. As shown, the fluid boundaries 184 may define the second end connecting passage 246 across the first quadrant and circumferentially to a second quadrant with respect to the axis 108 at the second end 200 of the e-charger 100. Flow from the first longitudinal passage 244 may be received by the second end connecting passage 246 and may flow arcuately about the axis 108, for example, to provide cooling to the bearing 214b. Flow from the second end connecting passage 246 may also be redirected toward the second longitudinal passage 248 of the cooling system 152. This flow is illustrated generally by arrow 247 in FIG. 7.

The second longitudinal passage 248 may be defined between the outer diameter surface 232 of the motor case 228 and the inner diameter surface 166 of the outer body 203. More specifically, the passage 248 may be defined between the intermediate surface 170d and the outer diameter surface 232 as shown in FIG. 5. The second longitudinal passage 248 may be fluidly connected to the second end connecting passage 246 and may receive flow therefrom. The nest surface 169d may nest, abut, and substantially conform to the surface 232 of the motor case 228, and the nest surface 169c may nest, abut, and substantially conform to the surface 232 of the motor case 228 to define the respective fluid boundary 184. As shown in FIG. 5, the second longitudinal passage 248 may be arcuate with respect to the axis 108. The second longitudinal passage 248 may extend arcuately within the second quadrant of the axis 108 (along with the second end connecting passage 246), and the second longitudinal passage 248 may pass longitudinally from the second end 200 to the first end 199 as indicated by arrow 249. The axis of the passage 244 may be parallel to the axis 108 in some embodiments. Coolant flow from the second end connecting passage 246 may be received by the second longitudinal passage 248 and directed longitudinally along the axis 108 from the second end 200 toward the first end 199 for cooling the motor 103. Flow from the second longitudinal passage 248 may be received in the first end connecting passage 256 (FIG. 6).

The first end connecting passage 256 may be defined at the first end 199 between the end plate 210 and the first longitudinal end face 230 of the motor case 228. The projections 215b, 215d and bearing mount 213 of the end plate 210 may nest, respectively, against the projections 221b, 221d, 225 of the motor case 228 to cooperatively define the respective fluid boundary 184. Also, the projection 215c may be spaced apart from the projection 221c in the longitudinal direction to define a gap that allows passage of the fluid from the second quadrant to a third quadrant of the e-charger 100. This flow path is indicated by arrow 257 in FIG. 6. This flow may allow the coolant in the first end connecting passage 256 to remove heat from the bearing 214a and/or the motor 103. Flow from the first end connecting passage 256 may be received in the third longitudinal passage 250.

The third longitudinal passage 250 may be defined between the outer diameter surface 232 of the motor case 228 and the inner diameter surface 166 of the outer body 203. More specifically, the passage 250 may be defined between the intermediate surface 170c and the outer diameter surface 232 as shown in FIG. 5. The nest surface 169c may nest, abut, and/or substantially conform to the surface 232 of the motor case 228, and the nest surface 169b may nest, abut, and/or substantially conform to the surface 232 of the motor case 228 to define respective boundaries 184. As shown in FIG. 5, the third longitudinal passage 250 may be arcuate with respect to the axis 108. The third longitudinal passage 250 may extend arcuately within the third quadrant of the axis 108, and the third longitudinal passage 250 may pass longitudinally from the first end 199 to the second end 200 as indicated by arrow 251. The axis of the passage 250 may be parallel to the axis 108 in some embodiments. Coolant flow from the first end connecting passage 256 may be received by the third longitudinal passage 250 and directed longitudinally along the axis 108 from the first end 199 to the second end 200 for cooling the motor 103. Flow from the third longitudinal passage 250 may be received in the second end connecting passage 254 (FIG. 7).

The second end connecting passage 254 may be defined at the second end 200 between the end plate 164 and the second longitudinal end face 234 of the motor case 228. The first portion 238 and the second portion 240 of the projection 235 may nest against the inner surface 172 of the end plate 164 to define the second end connecting passage 246 for cooperatively defining the fluid boundary 184. As shown, the second end connecting passage 254 may be confined to the third quadrant and a fourth quadrant of the e-charger 100. Flow from the third longitudinal passage 250 may be received by the second end connecting passage 254 and may flow arcuately about the axis 108, for example, to provide cooling to the bearing 214b. Flow from the second end connecting passage 254 may also be redirected to the fourth longitudinal passage 252 of the cooling system 152. This flow is illustrated generally by arrow 253 in FIG. 7.

The fourth longitudinal passage 252 may be defined between the outer diameter surface 232 of the motor case 228 and the inner diameter surface 166 of the outer body 203. More specifically, the passage 252 may be defined between the intermediate surface 170b and the outer diameter surface 232 as shown in FIG. 5. The nest surface 169b may nest, abut, and/or substantially conform to the surface 232 of the motor case 228, and the nest surface 169a may nest, abut, and/or substantially conform to the surface 232 of the motor case 228 to define respective boundaries 184 of the fourth longitudinal passage 252. As shown in FIG. 5, the fourth longitudinal passage 252 may be arcuate with respect to the axis 108. The fourth longitudinal passage 252 may extend arcuately within the fourth quadrant of the axis 108, and the fourth longitudinal passage 252 may pass longitudinally from the second end 200 to the first end 199 as indicated by arrow 253. The axis of the passage 252 may be parallel to the axis 108 in some embodiments. Coolant flow from the second end connecting passage 254 may be received by the fourth longitudinal passage 252 and directed longitudinally along the axis 108 from the second end 200 to the first end 199 for cooling the motor 103. Flow from the fourth longitudinal passage 252 may be received in the first end discharge passage 258 (FIG. 6).

The first end discharge passage 258 may be defined at the first end 199 between the end plate 210 and the first longitudinal end face 230 of the motor case 228. The projections 215a, 215b and bearing mount 213 of the end plate 210 may nest, respectively, against the projections 221a, 215b, 225 of the motor case 228 to cooperatively define the respective fluid boundary 184 for directing flow of the coolant. As shown, the first end discharge passage 258 may be confined to the fourth quadrant of the e-charger 100 with respect to the axis 108 at the first end 199 of the e-charger 100. Flow from the fourth longitudinal passage 252 may be received by the first end discharge passage 258 and turned radially, and redirected transversely and arcuately about the axis 108, for example, to provide cooling to the bearing 214a. The first end discharge passage 258 may also be connected to the outlet 156. Thus, hot coolant may exit the e-charger 100 via the outlet 156 to be replaced by fresh (lower temperature) coolant entering via the inlet 154.

The e-charger 100 may be highly manufacturable. The outer housing 202 may be formed via casting methods from aluminum in some embodiments. The motor case 228 may also be cast, for example, from aluminum. The stator 146 and rotor 148 may be formed to a predetermined shape, size, and configuration, and the motor 103 may be assembled within the motor case 228. Potting material may be used, and in some embodiments, the potting material may be conductive epoxy to maximize heat transfer through the motor 103 and motor case 228. Once assembled, the motor case 228 may be inserted into and enclosed within the outer housing 202 as discussed above. Then, the compressor section 111 may be installed and attached to the motor section 110. Subsequently, the e-charger 110 may be installed into the fuel cell system 102, for example, by attaching the electrical connectors 180 to the control system 134, by fluidly connecting the inlet 138 and the outlet 143 for airflow, and by fluidly connecting the inlet 154 and the outlet 156 for liquid coolant flow.

It will be appreciated that the cooling system 152 provides effective cooling. Also, the e-charger 100 is relatively compact, with a highly manufacturable design. Moreover, because the passages 158 are arranged in-series, there may be relatively few interfaces, seals, etc. to maintain. Additionally, this layout increases manufacturability. Furthermore, the cooling system 152 surrounds (jackets) the stator 146, the bearings 214a, 214b, and other areas of e-charger 100 for highly effective cooling. Also, the cooling system 152 may maintain suitable fluid pressure throughout and may avoid significant pressure loss therethrough.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. An e-charger comprising:
   a motor that drives a shaft for rotation about an axis, the axis extending through a first end of the motor and a second end of the motor;
   a compressor wheel that is attached to the shaft to be rotatably driven by the motor to thereby provide a compressed fluid stream;
   a bearing;
   a motor case that encases the motor, the motor case including a first end face proximate the first end, a second end face proximate the second end, and an outer diameter surface that extends longitudinally between the first end face and the second end face, the axis extending through the first end face and the second end face;
   an outer housing that houses the motor case, the outer housing including a body with a receptacle that receives the motor case and an end member that is attached to the body, the body and the end member cooperatively housing the motor case, the end member including a bearing mount and an aperture, the bearing being connected to the bearing mount and the shaft, the bearing supporting rotation of the shaft relative to the bearing mount, the shaft extending through the aperture, and the end member being disposed between the motor case and the compressor wheel; and
   a cooling system with an inlet, an outlet, and a plurality of passages fluidly connecting the inlet and the outlet, the plurality of passages cooperatively defined by the outer housing and the motor case, the plurality of passages including a first longitudinal passage, a second longitudinal passage, and an end passage, the first longitudinal passage extending between the first and second ends of the motor, the second longitudinal passage extending between the second and first ends of the motor, the end passage fluidly connecting the first longitudinal passage and the second longitudinal passage, the cooling system configured for directing flow of the coolant from the inlet, through the first longitudinal passage in a first longitudinal direction with respect to the axis, through the end passage, and back through the second longitudinal passage in a second longitudinal direction with respect to the axis, one of the first end face and the second end face cooperating with the outer housing to define the end passage, the end passage shaped to direct flow of the coolant radially along the one of the first end face and the second end face with respect to the axis; and the inlet and the outlet being defined in the end member of the outer housing.

2. The e-charger of claim 1, wherein the first longitudinal passage and the second longitudinal passage are arcuate with respect to the axis.

3. The e-charger of claim 1, wherein the bearing is a first bearing and the bearing mount is a first bearing mount;
further comprising a second bearing;
wherein the body includes a second bearing mount; and
wherein the end passage is proximate the second bearing for directing flow of the coolant to cool the second bearing.

4. The e-charger of claim 1, wherein the first longitudinal passage extends along a first passage axis, and the second longitudinal passage extends along a second passage axis, the first passage axis and the second passage axis being substantially parallel to the axis of the motor.

5. The e-charger of claim 1, wherein the motor case includes a first member and a second member that is attached to the first member with a seal member disposed therebetween.

6. The e-charger of claim 1, wherein the plurality of passages includes at least four longitudinal passages that extend between the first and second ends of the motor, the first longitudinal passage and the second longitudinal passage being ones of the at least four longitudinal passages; and
wherein the cooling system is configured for directing flow of the coolant through two of the at least four longitudinal passages in the first longitudinal direction; and
wherein the cooling system is configured for directing flow of the coolant through another two of the at least four longitudinal passages in the second longitudinal direction.

7. The e-charger of claim 6, wherein the plurality of passages includes a first longitudinal passage disposed in a first quadrant with respect to the axis, a second longitudinal passage disposed in a second quadrant with respect to the axis, a third longitudinal passage disposed in a third quadrant with respect to the axis, and a fourth longitudinal passage disposed in a fourth quadrant with respect to the axis.

8. The e-charger of claim 1, wherein the inlet and the outlet are disposed proximate the first end.

9. The e-charger of claim 8, wherein the inlet has an inlet axis and the outlet has an outlet axis;
wherein the inlet axis and the outlet axis are substantially parallel.

10. The e-charger of claim 9, wherein the inlet and the outlet are disposed on a common side of the axis.

11. The e-charger of claim 1,
wherein the motor case includes a first end face that faces the end member;
wherein the cooling system includes a first end receiving passage that fluidly connects the inlet and the first longitudinal passage, the first end receiving passage cooperatively defined by the end member and the first end face of the motor case.

12. The e-charger of claim 11, wherein the cooling system includes a first end connecting passage cooperatively defined by the end member and the first end face of the motor case;
wherein the cooling system includes a third longitudinal passage that extends between the first end and the second end of the motor case; and
wherein the cooling system is configured for directing flow of the coolant from the inlet, through the first end receiving passage, through the first longitudinal passage in the first longitudinal direction, through the end passage, through the second longitudinal passage in the second longitudinal direction, into the first end connecting passage, and into the third longitudinal passage.

13. The e-charger of claim 12, wherein the motor case includes the first end face, a second end face proximate the second end, and an outer diameter surface that extends longitudinally between the first end face and the second end face;
wherein the cooling system includes a first end discharge passage cooperatively defined by the end member and the first end face of the motor case;
wherein the end passage is a first end passage cooperatively defined by the second end face and the body;
wherein the cooling system includes a fourth longitudinal passage that extends between the first end and the second end of the motor case;
wherein the cooling system includes a second end passage cooperatively defined by the second end face and the body, the second end passage fluidly connecting the third longitudinal passage and the fourth longitudinal passage; and
wherein the cooling system is configured for directing flow of the coolant from the inlet, through the first end receiving passage, through the first longitudinal passage in the first longitudinal direction, through the first end passage, through the second longitudinal passage in the second longitudinal direction, into the first end connecting passage, into the third longitudinal passage in the first longitudinal direction, into the second end passage, into the fourth longitudinal passage in the second longitudinal direction, into the first end discharge passage and out via the outlet.

14. The e-charger of claim 1, wherein one of the motor case and the outer housing includes a projection, wherein the other of the motor case and the outer housing includes a surface that nests with the projection to cooperatively define a fluid boundary between adjacent ones of the plurality of passages.

15. The e-charger of claim 14, wherein the outer housing includes an inner diameter surface that includes the projection, and wherein the motor case includes the surface that nests with the projection, the surface of the motor case that nests with the projection being substantially smooth.

16. A method of manufacturing an e-charger comprising:
encasing a motor in a motor case, the motor configured to drive a shaft for rotation about an axis, the axis extending through a first end of the motor and a second end of the motor, the motor case including a first end face proximate the first end, a second end face proximate the second end, and an outer diameter surface that extends longitudinally between the first end face and the second end face, the axis extending through the first end face and the second end face;

providing a compressor wheel on the shaft to be rotatably driven by the motor to thereby provide a compressed fluid stream;

housing the motor case with an outer housing, the outer housing including a body with a receptacle, including receiving the motor case in the receptacle and attaching an end member to the body with the body and the end member cooperatively housing the motor case, the end member including a bearing mount and an aperture, a bearing being connected to the bearing mount and the shaft, the bearing supporting rotation of the shaft relative to the bearing mount, the shaft extending through the aperture, and the end member being disposed between the motor case and the compressor wheel;

providing a cooling system that is at least partly disposed between the motor case and the outer housing, the cooling system including an inlet, an outlet, and a plurality of passages fluidly connecting the inlet and the outlet, the plurality of passages cooperatively defined by the outer housing and the motor case, the plurality of passages including a first longitudinal passage, a second longitudinal passage, and an end passage, the first longitudinal passage extending between the first and second ends of the motor, the second longitudinal passage extending between the second and first ends of the motor, the end passage fluidly connecting the first longitudinal passage and the second longitudinal passage, the cooling system configured for directing flow of coolant from the inlet, through the first longitudinal passage in a first longitudinal direction with respect to the axis, through the end passage, and back through the second longitudinal passage in a second longitudinal direction with respect to the axis, one of the first end face and the second end face cooperating with the outer housing to define the end passage, the end passage shaped to direct flow of the coolant radially along the one of the first end face and the second end face with respect to the axis; and the inlet and the outlet being defined in the end member of the outer housing.

17. An e-charger comprising:

an electric motor that drives a shaft for rotation about an axis, the axis extending through a first end of the motor and a second end of the motor;

a compressor wheel that is attached to the shaft to be rotatably driven by the motor to thereby provide a compressed fluid stream;

a bearing;

a motor case that encases the motor, the motor case including a first end face proximate the first end, a second end face proximate the second end, and an outer diameter surface that extends longitudinally between the first end face and the second end face, the axis extending through the first end face and the second end face;

an outer housing that houses the motor case, the outer housing including a plurality of nesting surfaces that nest with the motor case, the outer housing including a body with a receptacle that receives the motor case and an end member that is attached to the body, the body and the end member cooperatively housing the motor case, the end member including a bearing mount and an aperture, the bearing being connected to the bearing mount and the shaft, the bearing supporting rotation of the shaft relative to the bearing mount, the shaft extending through the aperture, and the end member being disposed between the motor case and the compressor wheel; and a cooling system with an inlet, an outlet, and a plurality of passages fluidly connecting the inlet and the outlet, the plurality of passages cooperatively defined by the outer housing and the motor case;

the plurality of passages including a first longitudinal passage disposed in a first quadrant with respect to the axis, a second longitudinal passage disposed in a second quadrant with respect to the axis, a third longitudinal passage disposed in a third quadrant with respect to the axis, a fourth longitudinal passage disposed in a fourth quadrant with respect to the axis, a first end receiving passage at the first end and fluidly connecting the inlet and the first longitudinal passage, a second end connecting passage at the second end and fluidly connecting the first and second longitudinal passages, a first end connecting passage at the first end and fluidly connecting the second and third longitudinal passages, a second end connector passage at the second end and fluidly connecting the third and fourth longitudinal passages, and a first end discharge passage at the first end and fluidly connecting the fourth longitudinal passage and the outlet;

the first, second, third, and fourth longitudinal passages extending between the first and second ends of the motor;

the cooling system configured for directing flow of the coolant from the inlet, through the first end receiving passage and radially along the first end face, through the first longitudinal passage in a first longitudinal direction with respect to the axis, radially along the second end face and through the second end connecting passage, back through the second longitudinal passage in a second longitudinal direction with respect to the axis, radially along the first end face and through the first end connecting passage, through the third longitudinal passage in the first longitudinal direction, radially along the second end face and through the second end connector passage, through the fourth longitudinal passage, radially along the first end face and through the first end discharge passage, to the outlet; and the inlet and the outlet being defined in the end member of the outer housing.

18. The e-charger of claim 17, wherein the inlet has an inlet axis and the outlet has an outlet axis that is substantially parallel to the inlet axis;

wherein the inlet and the outlet are disposed proximate the first end on a common side of the axis.

* * * * *